United States Patent [19]
Hill

[11] 3,965,285
[45] June 22, 1976

[54] ELECTRICALLY CONDUCTIVE OBJECT HAVING AN ABLATIVE LAYER THEREON FOR PROTECTING THE SAME FROM DAMAGE BY AN ELECTRICAL DISCHARGE

[76] Inventor: Robert Dickson Hill, P.O. Box 5484, Montecito, Calif. 93108

[22] Filed: July 8, 1974

[21] Appl. No.: 486,665

[52] U.S. Cl. .......... 174/2; 29/195; 174/126 CP; 244/1 A; 317/2 E; 427/122; 427/189; 428/206

[51] Int. Cl.[2] .......... H05F 1/02; H02G 13/00; B64D 45/02

[58] Field of Search .......... 174/2, 3, 4 R, 4 C, 174/102 SC, 119 R, 119 C, 126 R, 126 CP, 127, 133 R; 117/160 A, 226; 244/1 A; 313/355; 317/2 E, 61; 29/195 C; 427/122, 189; 428/206, 208

[56] References Cited

UNITED STATES PATENTS

| | | | |
|---|---|---|---|
| 443,048 | 12/1890 | Hodges | 174/4 R X |
| 716,311 | 12/1902 | Thomson | 174/102 SC UX |
| 963,496 | 7/1910 | Bajohr | 174/4 R |
| 1,157,344 | 10/1915 | Thomson | 174/127 |
| 2,299,184 | 10/1942 | Slepian et al. | 117/226 X |
| 2,397,118 | 3/1946 | Bennett | 174/4 C UX |
| 3,416,027 | 12/1968 | Amason et al. | 174/2 UX |
| 3,528,629 | 9/1970 | Cooper | 244/1 A |
| 3,620,839 | 11/1971 | Geckle | 117/226 |
| R25,417 | 7/1963 | Amason | 317/2 E X |

OTHER PUBLICATIONS

Bennett, Abstract of Serial No. 731,454, filed Feb. 28, 1947.

*Primary Examiner*—Laramie E. Askin

[57] ABSTRACT

A process and structure are described for protecting objects from the damaging effects of electrical discharges by employing a coating of a conductive, ablative material such as graphite. Upon occurrence of an intense electrical discharge to this material, it evaporates to dissipate the heat produced by the discharge and protect the structural integrity of the object.

1 Claim, 4 Drawing Figures

FIG. 1
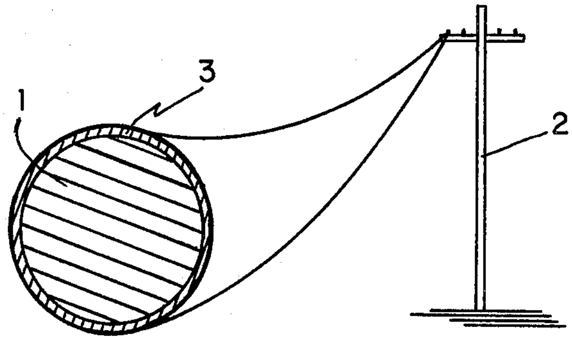
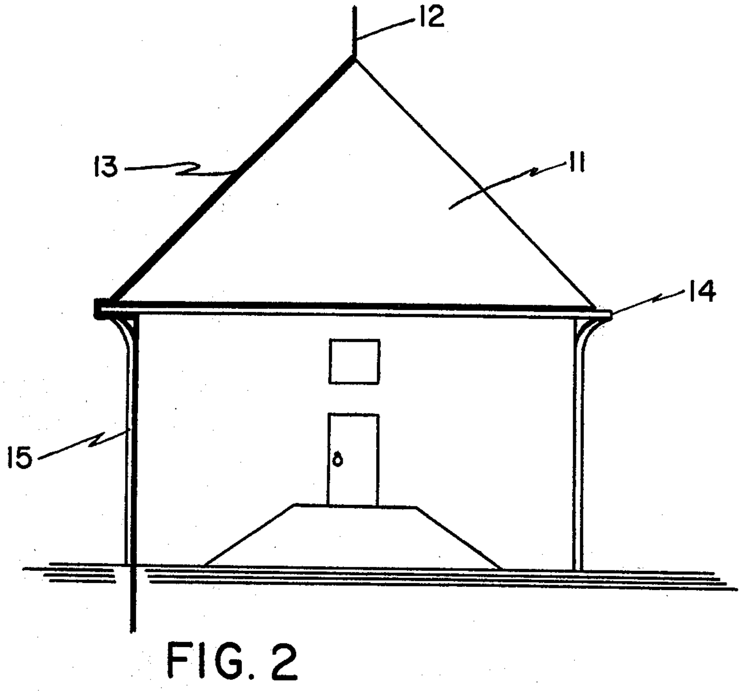
FIG. 2

FIG. 3
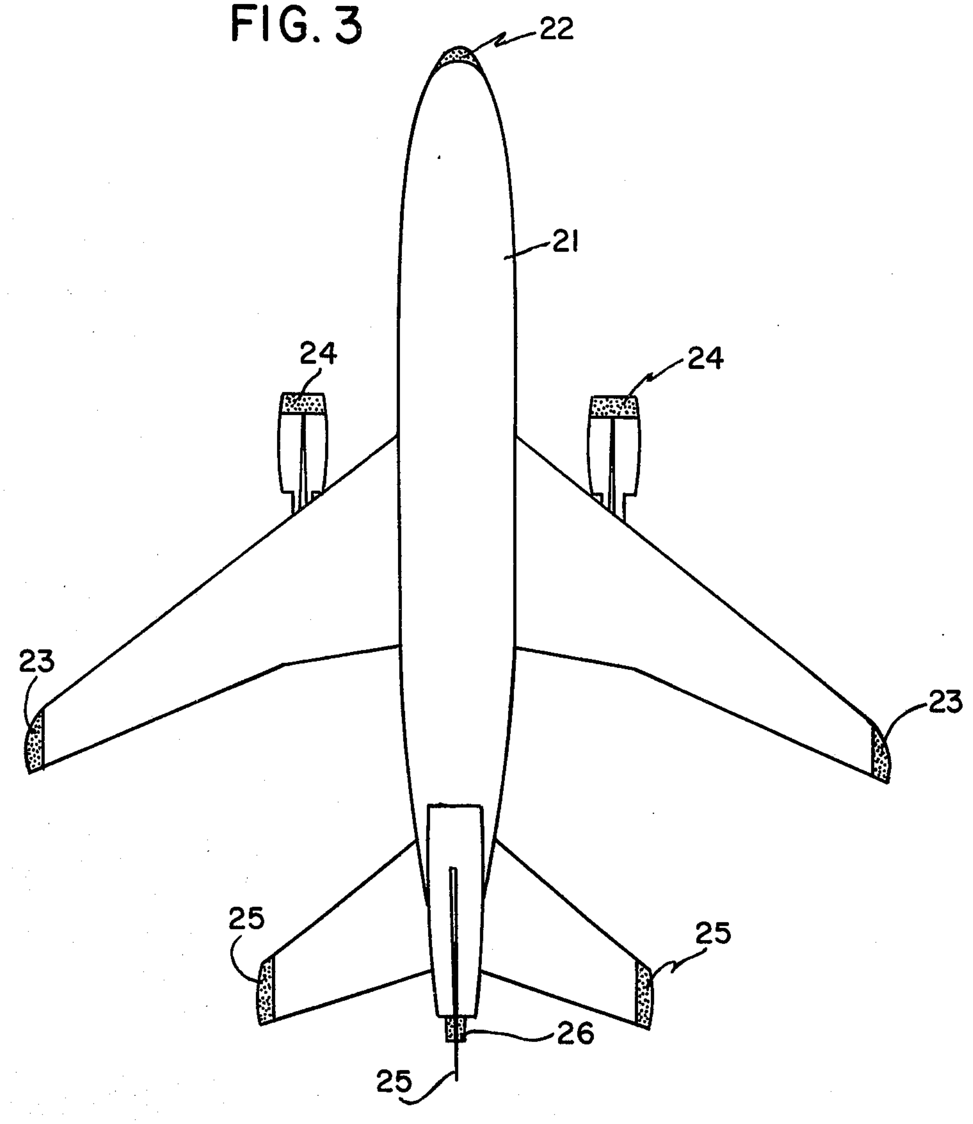
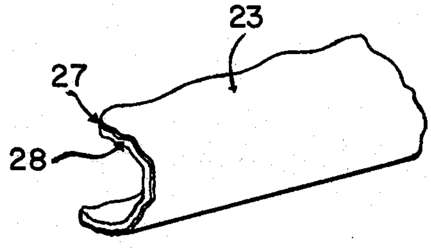
FIG. 4

ELECTRICALLY CONDUCTIVE OBJECT HAVING AN ABLATIVE LAYER THEREON FOR PROTECTING THE SAME FROM DAMAGE BY AN ELECTRICAL DISCHARGE

BACKGROUND OF THE INVENTION

This invention relates to a process and structure for protecting objects from electrical discharges by employing a coating of a conductive, ablative material such as graphite.

There are certain well established methods used for protecting objects, especially conductive ones, from making contact with other electrified objects or from being contacted by electrical discharges.

In relatively low voltage electric fields, discharges in air do not generally occur when a metal conductor is protected by small thicknesses of insulating material such as cotton or silk fabric, rubber or plastic coating, enamel or paint, resin, and porcelain. Insulation of this type is usually satisfactory for applications such as exterior and interior low voltage electric house wiring, and telephone, radio and television lead wires.

In relatively high voltage electric fields, however, it is generally not advantageous, unless a conductor has to pass in close proximity to another conductor, to cover either conductor with sufficient insulating material to prevent breakdown, for the required thickness would be impractical. Instead, the usual practice is to support an entirely uncovered high voltage conductor by a stand-off insulator so that the distance from neighboring objects, including the earth and storm clouds, exceeds the breakdown distance of the electric field in air. In fact, the addition of only a small amount of insulating coating such as was just described for low voltage insulation is generally considered to be deleterious, for if the coating is punctured by the discharge, the damaged insulation may subsequently act as a source of corona discharge and precipitate further breakdown.

It was pointed out by the inventor (see pages 430 and 431 of the book entitled *Problems of Atmospheric and Space Electricity*, edited by S. C. Coroniti, McGraw-Hill, 1965, and also pages 1365 to 1375 of the publication *Journal of Geophysical Research*, Volume 68, 1963) that, based on analyses of lightning strikes, the greatest contribution to damage from an intense electrical discharge, such as a lightning return stroke, appears to arise from the electronic heating of the conductor precisely at the conductor surface where the lightning stroke attaches.

Based upon such analyses, and upon many other experiments, various techniques and structures have been developed for preventing or minimizing the damage resulting from intense electrical discharges, especially lightning strikes. The literature, including the patent literature, is replete with examples of such techniques and structures. Adequate protection of high voltage lines, airplanes, buildings and many other objects exposed to such discharges is essential. Yet substantial damage continues to be produced by such discharges, even to objects thought to be adequately protected.

The present invention is directed to providing adequate protection for objects subject to electrical discharges, and to preserving conductors and metals which are now normally exposed without protection to high voltage fields that may cause breakdown, arcing or corona in air.

Adequate protection requires protection from both the electrical and mechanical effects of a discharge. Electrical protection includes appropriate fuses, high voltage shunts and other structures which, if designed with care, are satisfactory and prevent appreciable electrical damage. Protection against the subsequent mechanical effects of an intense electrical discharge, however, has proven considerably more difficult. Inspection and analysis of objects thought to be adequately protected often reveals that failure resulted from melting of the object at the point of impact, which not only weakened (usually to the point of failure) the object but also resulted in a discontinuity giving rise to arcing or corona discharge thereby precipitating further discharges to this weakened area.

To achieve adequate protection, this invention contemplates coating, or otherwise applying to the object, a material both capable of conducting the electrical current stroke and of dissipating away the localized heat generated by the stroke, preferably without melting. Rather, the material will vaporize under the localized heat imparted to it. The coated material has therefore preferably a high heat capacity to absorb heat energy directly by sublimation. A material of high latent heat of vaporization and of high melting point has the capability of dissipating a large amount of heat while maintaining its integrity as a solid. A material which is both a conductor and a heat absorber might be generally referred to as a conductive ablator. Graphite (an allotropic form of the element carbon) is an excellent example of a conductive ablator, for not only is it a moderately good conductor, especially at high temperatures, but it is also an excellent absorber of heat. Graphite remains a solid at a temperature of at least 3500°C and, at atmospheric pressure, probably vaporizes directly at temperatures above this without passing through a liquid phase. Other examples of a conductive ablator include tungsten, tantalum and titanium, which although costly and subject to melting at high temperatures nevertheless are capable of conducting a current stroke and dissipating considerable heat. Thus when an object protected by such a conductive ablator is subjected to an intense electrical discharge, for example a lightning stroke, the resulting electrical current will be conducted while the resulting and substantial direct surface heating will be dissipated by evaporation of the ablator. Considering a preferred embodiment, evaporation of a graphite coating in still air at temperatures of between 2000°C and 3600°C will result in an average loss in thickness of graphite on a surface parallel to the basal (slip) planes of between 0.005 and 0.001 inch per minute. In use, the actual loss of coating thickness even during an intense lightning strike to the surface will be rather minor, and only a thin coating is required for adequate protection.

In the following detailed description of the invention the process and structure for protecting objects from electrical discharges will be described, and a number of examples presented, in connection with the following drawings.

BRIEF DESCRIPTION OF THE DRAWINGS

The accompanying drawings include:

FIG. 1, a view partially in cross-section of a conductor protected by a conductive ablator;

FIG. 2, a view in elevation of a structure protected by a lightning conductor;

FIG. 3, a plan view of an airplane protected in part by conductive ablator areas; and FIG. 4, a perspective view of a section of the plane wingtip shown in FIG. 3.

DETAILED DESCRIPTION OF PREFERRED EMBODIMENTS

A number of embodiments of the invention will be discussed in detail. It will be obvious to those skilled in this field, however, that many other applications of such a protective coating can be envisioned for protecting objects from electrical discharges. For the sake of brevity, only the following three instances will be described:

1. Conductive ablator coating of wires to reduce the size and expense of conductors which are liable to rupture when struck by lightning. Wires in this category include: overhead "earth" wires for high voltage power distribution systems, antenna wires, unshielded power conductor wires, and many others.

2. Conductive ablator coating of lightning air-terminals and lightning down-conductors in order to reduce the liability to burn-through and flashover when struck by lightning.

3. Conductive ablator coating of selected aircraft external metal surfaces and parts in order to reduce pitting and possible burn-through when struck by lightning strikes. Other objects in this category include any vehicle which undergoes a trajectory in the troposhpere.

Referring now to FIG. 1, a conductor 1, normally of copper, is supported in air by a series of poles 2, one of which is shown. A coating of a conductive ablator 3 is provided on the conductor. Preferably the conductive ablator is pure polycrystalline graphite in a highly condensed, or compressed, form such as those forms known under the tradenames Graphitite, Carbitex, or Pyroid. Such coatings may be evaporated in a vacuum or otherwise applied to the conductor by any of various processes well-known to those skilled in the coating art. However applied, though, the resultant layer should achieve both a good mechanical and electrical contact with the underlying surface of the object substantially continuously over the protected area. Other conductive ablator materials can also be recommended. Among such materials are the high melting point metals: tantalum, tungsten, titanium, etc. These materials are good conductors and also reasonable ablators, that is until such time as they lose their integrities through melting. However, these materials do not vaporize from the solid to an extent or degree comparable to the extent shown by graphite. Metal ablators also have the disadvantages of high densities and high costs relative to graphite. If graphite is used, and it is the conductive ablator presently preferred, it should be noted that there is an orientation parallel to the basal planes in which both electrical and heat conductivity are high, and an orientation perpendicular to the basal planes, in which electrical and heat conductivity are lower. The layer of graphite preferably is applied to the object to be protected so that its basal planes (along which the thermal conductivity is higher than any other known material) are parallel to the surface of the object. Thus, when struck by an electrical discharge, the protective layer will tend to dissipate heat more rapidly in a lateral direction through itself than to the protected object, minimizing the heat load added to the protected object. This aids in minimizing the chance that the heat imparted to the object by the electrical discharge will weaken it sufficiently to cause mechanical failure.

For a high voltage conductor, preferably the graphite conductive ablator coating has a radial thickness of approximately 1 mm. Other conductive ablators will be of a greater or lesser thickness as appropriate in accordance with the following discussion. It should be noted, though, that when the conductor is protected by a conductive ablator as described herein, its size may be reduced considerably, resulting in quite significant material cost and weight savings. The size of the conductor should not be reduced to the point, however, that the resistance through it to a high current flow is great enough to produce substantial resistance heating during a high voltage discharge, for it may cause the conductor to melt and fail.

In order to withstand a direct lightning strike it has customarily been argued that the diameter of a conductor should be larger than a certain minimum value, given by a well-known engineering formula, so as to circumvent fusing of the wire in a statistically large number of lightning flash events. For example, it can be determined using the information provided by D. Muller-Hillebrand and published on pages 407 to 429 of the book entitled *Problems of Atmospheric and Space Electricity*, edited by S. C. Coroniti, McGraw-Hill (1965), that the diameter of a pure copper wire required to circumvent melting by a 140 kiloAmp lightning flash which occurs statistically only once in 500 flashes should be no less than 2.6 millimeters, or the equivalent of number 10 gage wire.

The recommended diameter of a pure copper overhead "earth" wire, however, according to the *Standard Handbook For Electrical Engineers*, page 26–12, $10^{th}$ Edition, edited by Fink and Carroll, and published by McGraw-Hill (1968), is 8.25 millimeters, or the equivalent of 1/0 gage wire. This recommended diameter is based on engineering experience in the field as distinct from a specific laboratory testing phenomenon such as melting of a wire. The disparity between the recommended diameter and the diameter calculated from a purely melting formula can be attributed to the fact that a wire struck by a lightning flash in the field is subject to considerably more heat at the point of contact with the flash than is produced along the length of the wire by the lightning current flow.

As summarized earlier, the purpose of the graphite coating 3 is to remove this considerable excess of heat generated at the point of lightning stroke contact through a process of absorption by evaporation of part of the graphite coating. It is calculated that a radial thickness of 1 millimeter of graphite should be sufficient to remove the heating effect of a 140 kiloAmp flash and to prevent the exposure of the copper underlying surface. Added protection from higher current, less probable, flashes may be obtained by increasing the radial graphite thickness. However, the thickness of graphite should not be increased too much beyond a few millimeters (preferably not more than two millimeters) because loss of efficiency will occur from added ohmic heating in the graphite which has an inferior electrical conductivity relative to copper and many other metals. Other conductive ablators exist and may be developed in accordance with the principles of this invention, and their requisite thickness for adequate protection will be determined in a similar fashion.

Similar considerations also apply to other wires such as antennas, overhead earth-unshielded power wires, etc.

Another advantage accruing from this invention is the use of conductive ablator coated wires for reducing high voltage corona, especially in the presence of polluted atmospheres where metal wires are subject to chemical attack, and also after corona discharge and lightning breakdown when metal wires may have been scarred.

At this time, much consideration is being paid to the posibility of increasing the voltages employed in the transmission of electrical power: voltages in the neighborhood of, and in excess of, one million volts have been suggested. Such extremely high voltage lines have an increased tendency to develop corona discharge, especially if reduced diameter wires are contemplated.

Conductive ablator coated sires such as just described will significantly reduce the tendency to corona discharge because of three effects: (a) the diameters of the coated wires are slightly larger than uncoated wires, (b) the coating adds an electrical resistance to the corona path as compared to uncoated wires, and (c) coated wires will reduce the occurrence of surface irregularities and concomitant tendency to corona. A further advantage of a conductive ablator (e.g. graphite) coated wire also lies in the higher chemical inertness of the coating compared to the uncoated metal wire.

Referring now to FIG. 2, a building 11 or similar structure has attached a lightning air terminal 12, and a lightning down-conductor 13 to conduct away a lightning discharge from the terminal to the ground. Preferably both the air terminal and the down-conductor are covered with a conductive ablator such as graphite. While an evaporated or adherent coating of material as described above is basically recommended, a simplified form of graphite coating could conceivably be suffcient in the case of lightning air-terminals or down-conductors. As an example of such a simplified coating, a tightly-fitting sleeve of woven or twisted graphite (or other conductive ablator) fibers could be used to cover a normal copper or iron air terminal and down-conductor.

Experience in the field, as reported by D. Muller-Hillebrand in the paper cited earlier has shown that lightning strikes often cause flashovers from lightning air terminals and down-conductors to occur to other close proximity conductors such as drain pipes, down-pipes, gutters, low-voltage electrical wiring and conduit, telephone wires, radio and television antennas and lead-in wires, etc. The close proximity of a gutter 14 and of a down-pipe 15 to the lightning down-conductor 13 is illustrated in FIG. 2.

Frequently flashover is accompanied by melting and rupture of the lightning down-conductor. This tendency to breakdown through melting is augmented by localized heating at the point of external electrical discharge. This direct surface heating has already been discussed herein.

The functions of a conductive ablator coated down-conductor are twofold: (a) to reduce the probability of flashover by the interposition of the coating between the two conductors involved in the flashover, and (b) to reduce the probability of melting of the down-conductor if flashover occurs. It is very probable that many secondary conductors involved in the flashover, such as telephone wires, low-voltage electrical wires, radio and television leads, have been damaged and often even vaporized after the flashover has caused the down-conductor to rupture. Use of a conductive ablator coating on the down-conductor can prevent this rupture thereby also protecting such secondary conductors.

Airplanes are vulnerable to lightning strikes while in flight. Even if protected by the techniques described in the literature it is still possible for them to be damaged severely by intense electrical discharges, and there continue to be documented cases of such damage.

Referring to FIG. 4, the areas of an airplane reported to be most subject to lightning strikes include the nose 22, wing tips 23, engine intake housings 24, tail tips 25, and engine exhaust housings 26 (see the report on pages 337–358 of the *Lightning and Static Electricity Conference*, 12–15 December 1972 proceedings published by National Technical Information Service, U.S. Department of Commerce December, 1972). Obviously it is vitally important to adequately protect airplanes from lightning produced damage.

In accordance with the principles of this invention such airplane areas likely to be struck by lightning may be protected by a coating of a conductive ablator. For example, as shown in FIG. 4 the wingtip 23 may have bonded thereto a coating or shell 27 of a conductive ablator. Such a shell preferably is formed of graphite, is on the order of a few millimeters thick, and is shaped to fit mechanically and electrically tight around the underlying metal aircraft skin 28. This tight fit results in a substantially continuous mechanical and electrical contact between the object and coating.

The extent of the aircraft skin which is to be covered by the conductive ablator material cannot be strictly defined. Larger areas of the wings, empennage and fuselage should be covered for higher degress of lightning damage protection.

The graphite coating may be fabricated separately and fitted finally to the aircraft section or it can preferably be integrated into the construction of these aircraft components. A number of alternative coating techniques can be employed, as is well known to those skilled in the coating art. For example, a suitable process for achieving complete mechanical and electrical contact would be by evaporation of the graphite directly onto the metal. However, other fabrication processes will undoubtedly be considered, and may be preferred, by those skilled in the coating art.

As has been noted earlier, one purpose of the present invention is to cover a metal surface with a conductive ablator such as graphite. This allows both electrical and thermal conduction to occur at the point of lightning stroke attachment and further allows the evaporation of a part of the graphite or similar coating to occur in the process of dissipating the localized heating. The presence of any insulating material in the path of the lightning discharge, such as has been proposed by others, will serve only to enhance the local heating at the point of lightning strike which, of course, should be avoided.

While preferred embodiments of the invention have been described, various modifications are possible and will occur to those skilled in this art. Accordingly, the scope of the invention is defined by the following claims.

I claim:

1. The electrically conductive object having an ablative layer for protecting the surface of said conductive object from damage by an electrical discharge, the said object being required to have no particular shape or mechanical form other than to have an electrically conductive surface or be a particular part or parts of an electrically conductive surface, said surface, part or parts of surface being potentially vulnerable to damage when located in an environment that may be subject to electrical breakdown or discharge, the said layer covering the surface of the conductive object or covering said part or parts of the surface of the conductive object potentially exposed, the said layer having a specific physical and solid-state structure, comprising: a continuous, anisotropic, polycrystalline layer of hexagonal graphite crystals, the said crystals being densely aggregated together so as to constitute a continuous layer of high electrical and thermal conductivities, the said crystals being strongly bonded to the underlying surface of the conductive object, the said ablative layer having a thickness perpendicular to the surface of the conductive object of between approximately one and two millimeters, and the said crystals having their basal planes substantially parallel to the surface of the conductive object.

* * * * *